Dec. 29, 1964  C. E. KRAUS  3,163,051
ROLLER CONSTRUCTION FOR TOROIDAL TRANSMISSIONS
Filed June 19, 1963  2 Sheets-Sheet 1

INVENTOR.
CHARLES E. KRAUS
BY *Julian Falk*
ATTORNEY

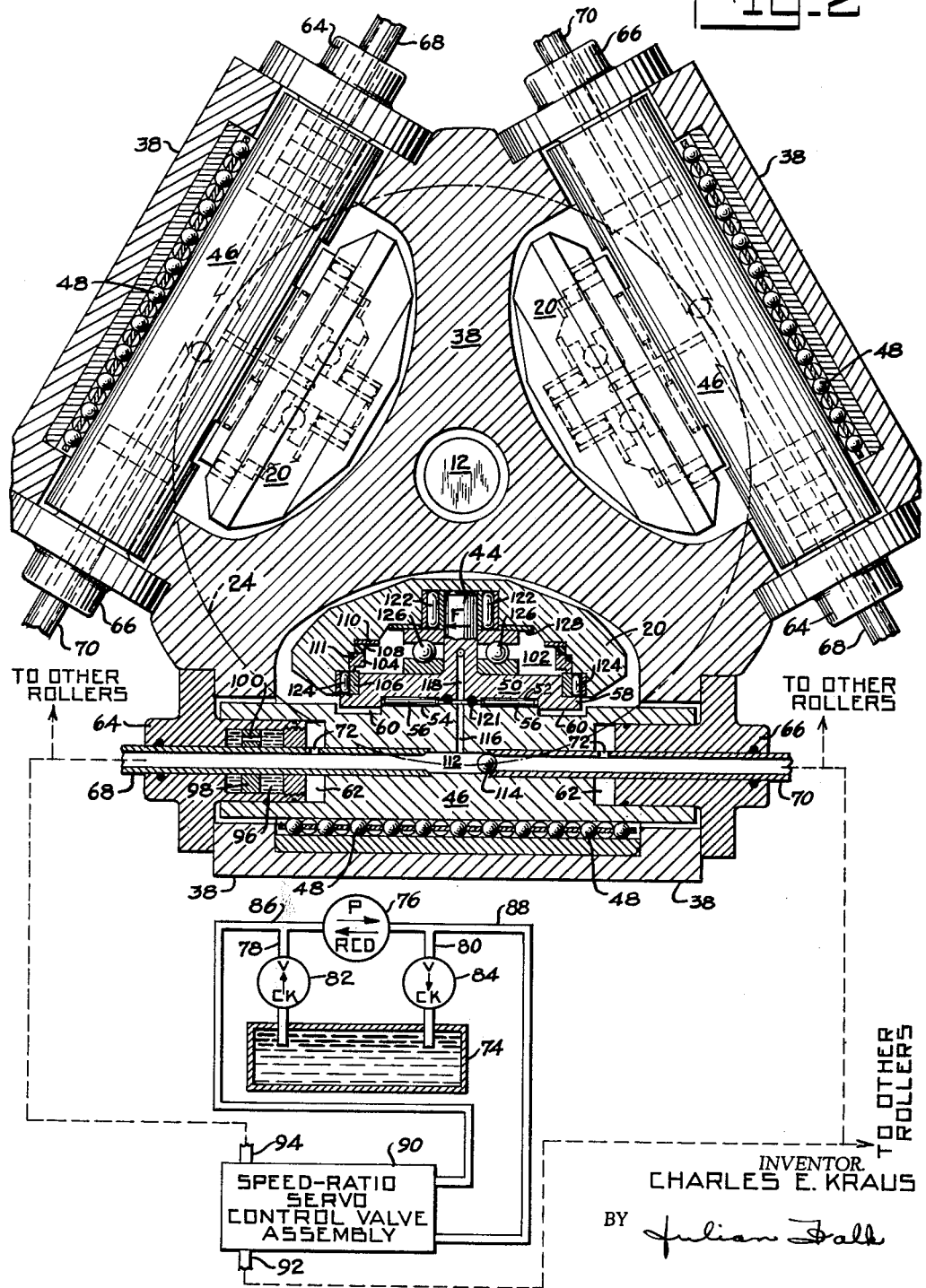

United States Patent Office 3,163,051
Patented Dec. 29, 1964

3,163,051
ROLLER CONSTRUCTION FOR TOROIDAL
TRANSMISSIONS
Charles E. Kraus, Franklin Lakes, N.J., assignor to
Excelermatic, Inc., a corporation of New York
Filed June 19, 1963, Ser. No. 289,022
9 Claims. (Cl. 74—200)

This invention relates to toroidal-type variable speed-ratio transmissions and particularly to an improved roller construction comprising hydrostatic bearing means.

Transmissions of this type generally comprise a pair of co-axial input and output drive members having facing toroidal or toric surfaces with a plurality of rollers disposed between and in friction contact with said surfaces and with each roller mounted for speed-ratio changing movement to change the speed-ratio of the driving connection provided by the rollers between the toroidal members. As disclosed in my prior Patent 3,008,337 issued November 14, 1961, the rollers are journaled by bearings on a spindle mechanism for rotation with respect to said spindle mechanism and with substantially no radially directed movement relative to said spindle mechanism with respect to the axis of the transmission. Substantially all radial and axial loads imposed on the rollers must be transmitted through the bearings which in the case of said patent are illustrated as ball-type bearings. Although the roller support mechanism disclosed in said patent has proven to be satisafctory, obviously however, the life and capacity of such type bearings are limited. Further, due to the fact that the rollers are not radially movable with respect to the transmission axis separate loading means are normally required for insuring contact with the rollers and the input and output members for all speed-ratio positions.

The present invention provides a new and improved roller mechanism by which the bearing life and load capacity is increased. Further, each roller member in the transmission embodying the invention is radially movable relative to a spindle supporting member so that the rollers may be urged into driving contacting engagement with the input and output toroidal members thereby eliminating the need for a separate loading mechanism for axially urging the input and output toroidal members toward each other. The invention is generally carried out by providing a hydrostatic bearing support means between the roller member and its supporting spindle mechanism through which substantially all radial loads imposed on the rollers are absorbed by the fluid of said hydrostatic bearing means. The fluid pressure for the hydrostatic bearing means of each roller member is further utilized for urging the roller member into driving contact with the input and output toroidal members, as will be explained in greater detail hereinafter.

Accordingly it is one object of the invention to provide a novel and improved bearing support mechanism for the rollers in the toroidal-type transmission.

Another object of the invention is to provide a novel bearing support means for the rollers in a toroidal-type transmission which is simple and rugged in construction.

A further object of the invention is to provide a novel hydrostatic thrust bearing support mechanism for the rollers in a toroidal-type transmission.

It is further an additional object of the invention to provide a novel bearing support mechanism for the rollers in a toroidal-type transmission which has greater loading capacity and longer running life than bearing support mechanisms heretofore used in such transmissions.

It is still another object of the invention to provide a novel hydrostatic thrust bearing support mechanism in a toroidal-type transmission wherein the rollers are movable in response to fluid pressure for maintaining driving contact with the input and output toroidal members of said transmission.

Other objects and advantages of the invention will become apparent upon reading the following detailed description with the accompanying drawings wherein:

FIG. 2 is a sectional view taken along line 2—2 of FIG. 1, with a fluid pressure control mechanism diagrammatically illustrated therein.

Figure 1:
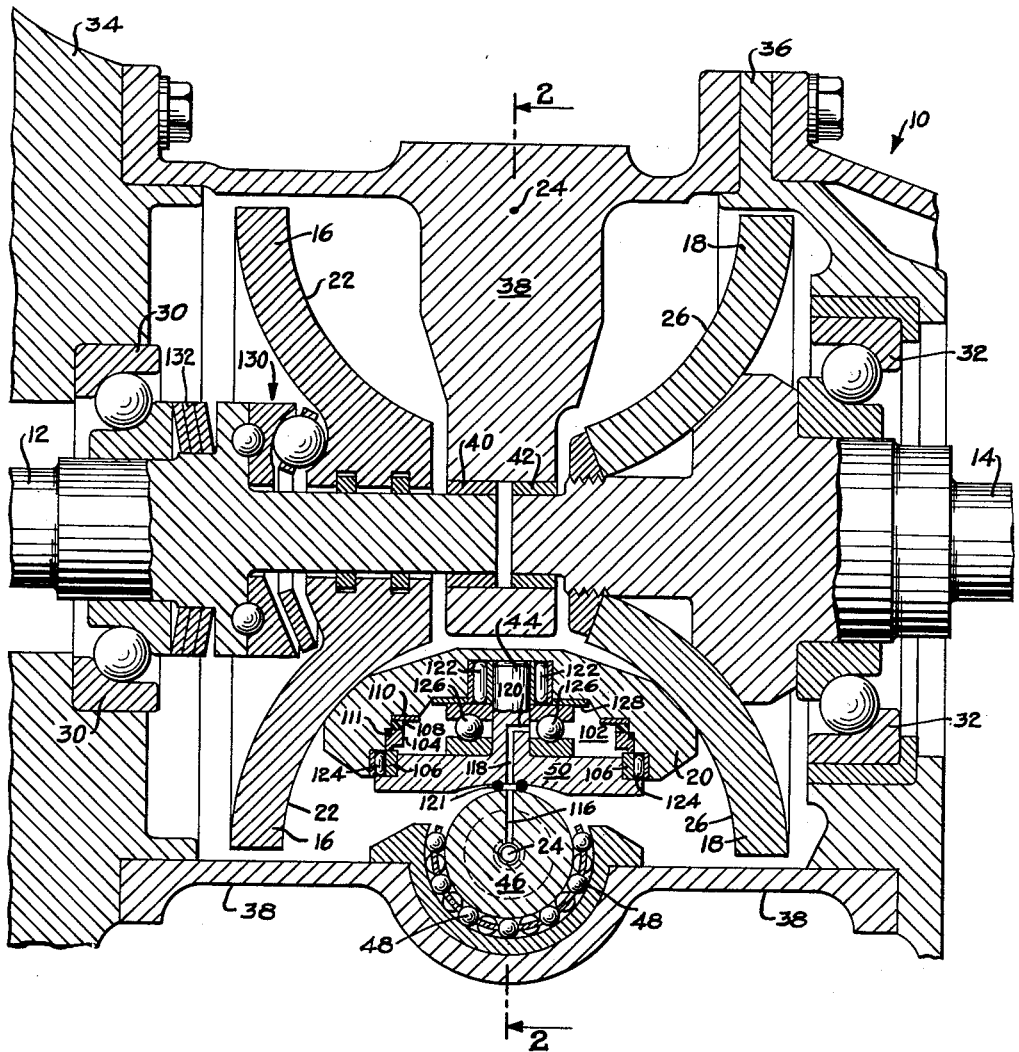
FIG. 1 is an axial sectional view through the transmission embodying the invention.

Referring now to FIGS. 1 and 2 of the drawings, a transmisison 10 is illustrated as comprising co-axial input and output shafts 12 and 14 respectively, input and output toroidal disc members 16 and 18 co-axially mounted on and drivably connected to the shafts 12 and 14 respectively and a plurality of circumferentially-spaced rollers 20 disposed between and in driving engagement with the toric surfaces of the disc members 16 and 18. Preferably, as illustrated, three rollers 20 are provided between the toroidal members 16 and 18 although the invention is not limited to this number. Also, at least one of the toroidal disc members 16 and 18 is axially movable toward the other. For this purpose the disc member 16 is supported on the input shaft 12 for axial movement therealong.

The input toroidal disc member 16 has a toroidal surface 22 which preferably is generated by rotating a substantially circular arc about the common axis of the input and output shafts 12 and 14, the center of the generating arc tracing a circle 24 as the toric surface 22 is generated. The output toroidal disc 18 has a similar toroidal surface 26 facing the input toroidal surface 22 and having substantially the same toric center circle 24.

The shafts 12 and 14 are supported by bearings 30 and 32, respectively in a multi-part housing including end sections 34 and 36 and an intermediate section 38 secured to said end sections. The intermediate housing section 38 is a Y-shaped frame structure between which the rollers 20 are disposed, said Y-shaped structure providing end bearings 40 and 42 for the adjacent ends of the shafts 12 and 14.

Each roller 20 is supported on a spindle 44 in a manner which will be explained in greater detail below. Each spindle 44 is further supported by a pivot shaft 46 from which it extends in a radially inward direction toward the transmission axis for speed-ratio changing movement of its roller about the axis of its pivot shaft 46 relative to the toroidal surfaces 22 and 26. With this arrangement, each roller 20 is disposed on the radially inner side of its associated pivot shaft 46. The axis of each pivot shaft 46 is substantially tangent to the toroidal center circle 24 and is disposed in a plane perpendicular to the transmission axis. Thus, the pivot shafts 46, like the rollers 20 are circumferentially-spaced about the transmission axis, with one pivot shaft 46 being provided for each roller 20. Each pivot shaft 46 is journaled on a substantially semi-cylindrical bearing 48 carried by the intermediate housing section 38 in a manner clearly illustrated in FIGS. 1 and 2. A more detailed description of the specific type bearing, such as bearing 48, may be found in my co-pending application Serial No. 266,363 filed March 19, 1963 and entitled "Roller Support Mechanism for Toroidal Drive." Each roller spindle 44 has an end plate 50 having a pair of substantially semi-cylindrical grooves 52 facing a corresponding pair of grooves 54 in the surface of the central portion of its associated pivot shaft 46. Each such semi-cylindrical groove 52 and 54 is disposed parallel to the axis of its associated pivot shaft 46. A pair of pins 56 are received in each facing pair of grooves 52 and 54 so that through the pins 56 the associated roller 20 is supported by the shaft 46 for speed-ratio changing movement of the roller with and about the axis of its shaft 46. Each pin 56 also permits a limited pivotal movement of its associated roller 20 about the axis of said pin to equalize the contact pressures of said roller against the toric surfaces 22 and 26.

Each pivot shaft 46 has a limited movement along its axis and its associated roller spindle end plate 50 has depending portions 58 thereon which are received within a corresponding cut-out or groove 60 in the shaft 46 so that movement of a shaft 46 along its axis results in a corresponding movement of its roller 20 in this direction. The cut-out or grooves 60 on each pivot shaft 46 are disposed with respect to the depending portions 58 on the end plate 50 so that said grooves 60 and the depending portions 58 do not interfere with the limited pivotal movement of the associated roller spindle 44 about the axis of the pins 56 to equalize the contact pressures of the associated roller 20 against the toric surfaces 22 and 26.

If the direction of rotation of the transmission is such that as viewed in FIG. 2 the input toric member 16 rotates clockwise, the traction forces F exerted by the toric members 16 and 18 on, for example, the lower roller 20 are directed toward the left. Any unbalance of the traction forces on a roller and the forces along and on its pivot shaft 46 results in movement of the roller and its pivot shaft 46 along the axis of said shaft. As fully explained in the aforementioned patent, such movement of a roller 20 along the axis of its pivot shaft 46 results in speed-ratio movement of the roller with and about the axis of its pivot shaft 46 to a speed-ratio position in which said forces are again in balance.

As is known, speed-ratio changing movement of the rollers may be produced by tilting of each roller about an axis through or parallel to a line through the points of contact of the roller with the toric members 16 and 18. As is also disclosed in said patent, if such a roller tilt axis is offset from a line through the roller points of contact with the toric members, then the traction forces exerted by the toric members 16 and 18 on each roller apply a turning moment on the roller about its tilt axis which may be balanced by the hydraulic control force. Accordingly, it is within the scope of this invention to use such roller tilting to induce speed-ratio changing movement of the rollers instead of shifting of each roller along the axis of its pivot shaft 46.

As stated above, precessional or speed-ratio changing movement of the rollers 20 may be induced by translation of the pivot shafts 46 along their axes. For this purpose, a fluid control pressure may be applied to either end or a fluid pressure differential may be applied across said ends of the pivot shafts 46 so that translational movement of the pivot shafts 46 may be induced in accordance with the fluid pressure changes applied thereto. As illustrated in FIG. 2, each pivot shaft 46 is provided with cavity portions 62 in each end thereof and extending axially into said cavity portions 62 are insert members 64 and 66, said insert members 64 and 66 being suitably fixed to the intermediate housing 38. Shafts 68 and 70 are also provided, said shafts extending through each end of each pivot shaft toward the center portions thereof but terminating substantially short of said center portion. Said shafts 68 and 70 are suitably fixed to the pivot shafts 46 so as to translate therewith. As further shown in FIG. 2, the shafts 68 and 70 each have a passage extending through their center portions so that a fluid pressure may be introduced through said shafts for inducing translational movement of said shafts 46 and their respective shafts 68 and 70. Each shaft 68 and 70 is further provided with a fluid passage 72 which extends radially from the center fluid passage, said passages 72 communicating with the cavity defined by the axially inner end of the pivot shaft cavity 62 and the respective insert members 64 and 66. It can be seen therefore, that a fluid pressure may be introduced through each of the shafts 68 and through its respective passage 72 into the adjacent cavity 62 so as to act against the adjacent end of the associated pivot shaft 46 in opposition to the traction forces F on the rollers. If these are the only forces involved and they are not balanced, the pivot shafts will translate in the direction of the unbalance to induce a speed-ratio changing movement of the rollers to a position in which said forces are in balance. So it can be seen, that the end face of pivot shaft 46 in each cavity 62 serves as a piston face to which fluid pressure may be applied for inducing translational movement of the pivot shaft 46.

A suitable means for supplying fluid pressure to the pivot shaft 46 may be provided and may take the form of that shown diagrammatically in FIG. 2. As seen in said figure, a suitable fluid reservoir 74 may be provided. A suitable pump 76 may also be provided which, if used with a drive means for the transmission which is reversible, may be of the reversible type. The pump 76 is connected to the fluid reservoir 74 through conduits 78 and 80, each having a suitable check valve 82 and 84, respectively, for insuring proper direction of flow. The pump 76 will provide a fluid pressure to fluid conduits 86 and 88 depending upon the direction of pump rotation, said fluid pressure being in turn supplied to a suitable speed-ratio servo-control valve assembly 90. The servo-control valve assembly 90 may have a plurality of servo valves therein (not shown) each being suitably connected to one of the fluid pressure conduits 86 and 88. Further, the servo valves may have suitable adjusting means connected thereto for varying the fluid pressure from said servo valves to fluid pressure conduits 92 and 94 each of which is suitably connected to one of the servo valves. The fluid pressure conduits 92 and 94 are connected to the fluid passage in one of the shafts 68 and 70, respectively, for each of the rollers so that as illustrated in FIG. 2 each of the fluid pressure conduits 92 is connected to one shaft 68 for each of the pivot shafts 46 and each of the fluid pressure conduits 94 is connected to a shaft 70 of each of the pivot shafts 46. However, it should be understood that the fluid pressure control system itself forms no part of the present invention and any suitable means for supplying fluid pressure to the shafts 68 and 70 may be used. For example, a fluid pressure system such as that shown in co-pending application Serial No. 259,982, filed February 20, 1963 and entitled "Ratio Control for Toroidal Transmissions" invented by Michael Davis and myself may be used instead of the system diagrammatically illustrated in FIG. 2.

Each of the insert members 64 preferably is further provided with a closed cavity portion 96 therein which is substantially filled with fluid. A damping piston 98 is fixed to the shaft 68 and positioned within the cavity 96 so that, as the pivot shaft 46 and its fixed shaft 68 translate, the damping piston 98 translates therewith with respect to the insert members 64. A restricted passage 100 is provided in the damping piston 98 for allowing restricted flow of the fluid in cavity 96 between the faces of the piston 98. Therefore, any sudden translational movements of the pivot shafts 46 will be dampened by the restricted flow of fluid between the faces of said damping piston 98. Reference may be made to United States Patent 3,048,047, issued on August 7, 1962, for a more detailed description of the function of the damping mechanism.

As further illustrated in FIGS. 1 and 2, a cavity portion 102 is formed between the inner wall of each roller 20 and its spindle supporting member 44. The cavity 102 is sealed between the roller 20 and it supporting spindle member 44, by a suitable sealing means such as seal member 104, which may be a carbon-type seal, said seal 104 riding on a hardened ring member 106 which is secured to the spindle end plate 50 and said seal member 104 being maintained in engagement with the ring member 106 through an engaging ring member 108 which may be a rubber type compressible ring member, and a Belleville spring 110 which biases the ring 108 and seal 104 against the ring member 106. Thus, as the roller 20 rotates or, if the roller 20 is moved radially along the axis of spindle 44, the seal 104 will always be maintained in sealing engagement with the hardened ring member 106. A suitable seal member 111 may also be provided, as illustrated, for preventing fluid from leaking around the spring 110, ring 108, between the roller 20 and the seal 104.

The passages in shaft 68 and 70 each terminate at the central portion of pivot shaft 46 in a central enlarged passage or cavity 112. Positioned in the passage 112 is a ball valve 114 which in response to a greater pressure from one of the passages in shafts 68 and 70 than from the other of said passages in shafts 68 and 70, will seat itself against the inner end of the other of said shafts 68 and 70 so that the fluid pressure will not flow from one passage in shaft 68 and 70 to the passage in the other of said shafts 68 and 70. Thus, it will be understood, that when either of the passages in shaft 68 and 70 is supplied with pressure, which is greater than the pressure in the other of said passages, fluid pressure will always be supplied to the enlarged passage 112. A fluid passage 116 extends radially from enlarged passage 112 through the pivot shaft 46 and communicates with a fluid passage 118 in the spindle support member 44 which in turn communicates with a feed passage 120 to cavity 102. A suitable seal 121 is provided adjacent to the mating area of passages 116 and 118 to prevent any fluid leakage between the pivot shaft 46 and the spindle 44. Therefore, the fluid control pressure from the servo-control valve assembly which is supplied to either of the passages in shaft 68 and 70 will also be supplied to the cavity 102 between the roller 20 and its spindle member 44.

During transmission operation the servo-control valve assembly may be adjusted to regulate the control pressure in passage 92 or 94 to a value for causing speed-ratio changing movement of the pivot shafts 46 and the rollers 20 to a particular speed-ratio position at which the control pressure against the pivot shaft 46 of each roller balances the traction forces F exerted on the roller by the toric surfaces 22 and 26. The same fluid pressure used for inducing translational movement of the pivot shaft 46 is supplied to the cavity 102, as explained above, and therefore the fluid pressure in said cavity 102 will always be in proportion to the tangential traction forces on the rollers for a particular speed-ratio position. Further, since each roller cavity 102 will be filled with fluid under pressure a fluid thrust bearing is provided for the rotating roller 20 for urging the roller inwardly along its spindle 44 into contact with the toric surfaces 22 and 26 with a force proportional to said fluid control pressure. Since this pressure is proportional to the traction forces F on each roller, by proper choice of the roller area on which the pressure in each roller cavity acts, slippage between each roller and the toric surfaces can be avoided. It has been found that the fluid thrust bearing provided by the fluid pressure in cavity 102 has a substantially larger loading capacity than the mechanical friction bearings previously used such as that shown in the aforementioned patent. Needle-type bearings 122 and 124 are provided between the roller 20 and the spindle 44 and between the roller and the spindle end plate 58 and ring 106, respectively, in order to properly align the roller on the spindle support mechanism and for absorbing radial forces of each roller relative to its spindle axis. A roller thrust bearing 126, which may be of the ball type, as illustrated, is also provided between each roller and the end plate 50 of its spindle 44 for carrying thrust loads of the roller along its spindle prior to the application of the control pressure to the roller or in the event of a pressure failure so that the rollers will not be damaged. In addition a Belleville spring 128 is provided to maintain the races of the thrust bearings 126 in contact with their rollers when pressure is applied to the associated cavity 102 for urging the rollers inwardly along their spindles 44 into contact with the toric surfaces. Since radial thrusts in the direction of the spindle axis are substantially completely absorbed by the fluid thrust bearing during transmission operation, the thrust bearings 126 are subject to very little wearing effect and the running life of said bearings 126 is therefore not a determining factor in the overall running life of the transmission as was the case in previous transmissions depending solely on mechanical friction bearings.

A cam and sprag device 130 may also be provided for transmitting torque to axially loading of the toroidal disc members 16 and 18 toward one another for providing a driving engagement between the disc members and the roller 20. A pre-load spring 132, which may be a Belleville spring, may also be provided for providing an initial contact pressure or pre-load between the rollers 20 and disc members 16 and 18. A more detailed description of the cam and sprag device may be found in my co-pending application Serial No. 94,188, filed on March 8, 1961. Said details of the cam and sprag device 130 form no part of the present invention.

As explained in said above-mentioned co-pending application, due to inertia effects, the tangential forces on the rollers do not fluctuate as quickly as do the torque loads on the transmission. Therefore, when sudden fluctuations in torque arise the cam and sprag device 130 may suddenly unload the disc member 16 and since the tangential traction forces on the rollers tend to lag, slippage may occur between the rollers and the disc members 16 and 18 due to loss of contacting engagement. As further explained in said co-pending application, a separate loader mechanism may be provided axially loading the toroidal disc members 16 and 18 toward each other for preventing such slippage.

The present invention eliminates the need for a separate piston loader mechanism. The fluid pressure supplied to the fluid thrust bearing cavities 102 causes each roller 20 to move radially inwardly along the axis of its spindle 44 in proportion to the fluid pressure supplied thereto. As the cavity 102 is filled with the fluid under pressure, the rollers are therefore urged into contacting engagement with the input disc 16 and the output disc 18, which due to the fact that the pressure in said cavity is the same as the pressure used for adjusting the speed-ratio position of the rollers, the contact pressure between the rollers and the discs will therefore be proportional to the tangential traction forces. Thus, as the fluid control pressure is varied for opposing the tangential traction forces on the rollers, the contact pressure between the rollers and the disc will be proportionately varied. So it can be seen that the contact pressure between the rollers and toric members 16 and 18 will be maintained proportional to the roller traction forces F and the roller will always be maintained in contacting engagement with the disc members for all speed-ratio positions of said rollers and that no slippage will occur, and the need for a separate loader mechanism is eliminated.

From the above detailed description, it will be seen that a novel and improved bearing mechanism for the rollers in a toroidal type transmission has been provided which bearings have improved loading capacity characteristics and running life over previous bearings used in transmissions of this type. Further, it has also been shown that the need for a separate loading mechanism has been eliminated and a novel and improved means for maintaining contacting engagement between the rollers and the input and output disc members has been provided.

While I have described my invention in detail in its present preferred embodiment, it will be obvious to those skilled in the art, after understanding the invention, that various changes and modifications may be made therein without departing from the spirit and scope thereof. For example, if the transmission of the invention is intended to be used with a non-reversible motor, it will be understood that fluid pressure may be supplied from only one end of the pivot shafts for opposing the tangential traction forces and the ball valve 114 may be eliminated. Also, other suitable fluid supply means may be substituted for that as described herein. I aim in the appended claims to cover all such modifications.

I claim:
1. A variable speed-ratio transmission comprising:
   (a) co-axial input and output members having facing toric surfaces;
   (b) a plurality of circumferentially-spaced rollers disposed between said surfaces and in driving contact with said surfaces for transmitting torque from the input member to the output member;
   (c) a spindle for each roller on which the roller is journaled for rotation about the spindle axis;
   (d) bearing means supporting each roller on its spindle and including means providing an annular bearing space for receiving a fluid under pressure to provide a fluid thrust bearing between the roller and one end of its spindle;
   (e) support means for each roller and spindle including a pivot shaft and from which the spindle extends at right angles inwardly toward the transmission axis with said spindle thrust bearing end being disposed adjacent to the pivot shaft, said pivot shafts being supported for pivotal movement for speed-ratio changing movement of their rollers across said toric surfaces and being supported for translational movement along their respective axes for initiating said speed-ratio changing pivotal movement of said rollers;
   (f) means for supplying a control fluid under pressure for applying a control force against each of said pivot shafts in opposition to the traction forces exerted by toric surfaces on the rollers for controlling the speed-ratio position of said rollers;
   (g) and means for supplying a fluid under pressure derived from said control fluid to said thrust bearing space of each roller for urging the rollers along their respective spindles into driving contact with said toric surfaces.

2. A variable speed-ratio transmission as recited in claim 1 wherein said means for supplying a control fluid under pressure includes:
   (a) means for supplying said control fluid to each end of each of said pivot shafts;
   (b) and said means for supplying a fluid under pressure to said thrust bearing space being operatively connected to means for supplying said control fluid to each end of each of said pivot shafts so that said fluid under pressure will be supplied to said thrust bearing space from either end of said pivot shafts.

3. A variable speed-ratio transmission as recited in claim 2 further including:
   (a) valve means operatively connected between each end of each of said pivot shafts and said thrust bearing space for each roller, said valve means being operative in response to control fluid pressure from either end of each of said pivot shafts for blocking said means for supplying fluid under pressure to said thrust bearing space from the other end of each of said pivot shafts.

4. A variable speed-ratio transmission as recited in claim 3 further including:
   (a) passage means extending from each end of each pivot shaft to a center cavity therein for supplying said control fluid under pressure to said center cavity;
   (b) said means for supplying a fluid under pressure to derived from said control fluid to said thrust bearing space being operatively connected to said center cavity;
   (c) and said valve means being operatively positioned in said center cavity and operative in response to control fluid pressure from one of said passage means for blocking the other of said passage means so that fluid under pressure will be supplied to said thrust bearing space from said passage means having a greater fluid pressure relative to the fluid pressure from the other of said passage means.

5. A variable speed-ratio transmission as recited in claim 1 including:
   (a) seal means for substantially sealing off fluid flow from said thrust bearing space between each roller and its spindle;
   (b) and means for maintaining sealing contact between said roller and its spindle during movement of said roller along said spindle.

6. A variable speed-ratio transmission comprising:
   (a) co-axial input and output members having facing toric surfaces;
   (b) a plurality of circumferentially-spaced rollers disposed between and in driving contact with said surfaces for transmitting torque from the input member to the output member;
   (c) a spindle for each roller on which the roller is journaled for rotation about the spindle axis;
   (d) bearing means supporting each roller on its spindle and including means providing an annular bearing space for receiving a fluid under pressure to provide a fluid thrust bearing between the roller and one end of its spindle;
   (e) support means for each roller and spindle including a pivot shaft and from which the spindle extends at right angles inwardly toward the transmission axis with said spindle thrust end being disposed adjacent to the pivot shaft, said pivot shafts being supported for pivotal movement for speed-ratio changing movement of their rollers across said toric surfaces, each roller support means also including means providing for movement of its roller in a second mode such that in response to movement of said roller in said second mode-ratio changing pivotal movement of said rollers about its pivot shaft axis is initiated;
   (f) means for supplying a control fluid under pressure for imposing a fluid pressure force in each roller to effect movement of said roller in its second mode;
   (g) and means for supplying a fluid under pressure derived from said control fluid to said thrust bearing space of each roller for urging said rollers along their respective spindles into driving contact with said toric surfaces.

7. A variable speed-ratio transmission as recited in claim 6 in which:
   (a) said second mode movement of each roller is a linear movement along a path parallel to the axis of its pivot shaft;
   (b) and said control fluid under pressure is supplied to said pivot shafts for applying a control force against said pivot shafts in opposition to the traction forces exerted by said toric surfaces on said rollers such that in response to said control force translational movement of said pivots along their axes is induced for initiating speed-ratio changing pivotal movement of said rollers.

8. A variable speed-ratio transmission as recited in claim 6 in which:
   (a) said means for supplying a control fluid under pressure includes means for supplying a relatively high fluid pressure to one end of each of said pivot shafts in opposition to said traction forces and a relatively low fluid pressure to the other end of each of said pivot shafts in the direction of said traction forces such that movement of said rollers in their second mode is induced in response to said relatively high fluid pressure.

9. A variable speed-ratio transmission as recited in claim 8 in which:
   (a) said means for supplying a fluid under pressure derived from said control fluid to said thrust bearing space of each roller is operatively connected to said ends of each of said pivot shafts;

(b) and valve means operatively connected between the ends of each pivot and the thrust bearing space of its roller, said valve means being operative in response to said relatively high fluid pressure from one end of each said pivot shaft for blocking the operative connection between the other end of each said pivot shaft and said thrust bearing space such that said rollers are urged along their spindles into driving contact with said toric surfaces by a fluid pressure force proportional to the fluid pressure force for inducing second mode movement of said rollers.

No references cited.